United States Patent [19]
Bergin

[11] Patent Number: 6,095,746
[45] Date of Patent: Aug. 1, 2000

[54] MOTORCYCLE MANEUVERING APPARATUS

[76] Inventor: Alan Bergin, 6 Calshot Court, Osbourne Road, Stone Dartford, Kent DA2 6RL, United Kingdom

[21] Appl. No.: 09/466,080

[22] Filed: Dec. 17, 1999

[51] Int. Cl.[7] ........................................................ B60P 3/00
[52] U.S. Cl. .................. 414/430; 414/426; 280/402; 280/79.11; 280/79.4; 269/216; 269/17
[58] Field of Search ...................... 280/402, 79.4, 280/79.11; 269/240, 216, 17; 414/563, 426, 430, 537, 462, 589, 240, 255, 256

[56] References Cited

U.S. PATENT DOCUMENTS

| Re. 12,430 | 1/1906 | Weber | 414/430 |
|---|---|---|---|
| 2,610,750 | 9/1952 | Hulbert | 414/430 |
| 2,899,087 | 8/1959 | Jacobsen | 414/256 X |
| 5,486,014 | 1/1996 | Hough | 280/79.11 |
| 5,609,461 | 3/1997 | Lichtenberg | 414/426 |
| 5,984,339 | 11/1999 | Guild | 414/430 X |

FOREIGN PATENT DOCUMENTS

2-60863   3/1990   Japan ................... 280/79.4

*Primary Examiner*—Frank E. Werner

[57] ABSTRACT

A motorcycle maneuvering apparatus for moving a motorcycle about in a cramped location. The motorcycle maneuvering apparatus includes a front dolly member having wheels, a pair of frame sections mounted thereupon, a pair of cross members secured to the frame sections, and a pair of tire support member threaded upon the cross members, and further includes a middle dolly member having wheels, a platform mounted thereupon, and a pair of adjustable kickstand retaining members, and also includes a rear dolly member having wheels, a pair of frame sections mounted thereupon, a pair of cross members secured to the frame sections, and a pair of tire support member threaded upon the cross members, and in addition includes a ramp member having a pair of arm members for removably mounting to the front and rear dolly members to load the tires thereupon.

11 Claims, 6 Drawing Sheets

MOTORCYCLE MANEUVERING APPARATUS

BACKGROUND OF THE INVENTION

1. Field of the Invention

The present invention relates to a dolly means for supporting and maneuvering a motorcycle and more particularly pertains to a new motorcycle maneuvering apparatus for moving a motorcycle about in a cramped location.

2. Description of the Prior Art

The use of a dolly means for supporting and maneuvering a motorcycle is known in the prior art. More specifically, a dolly means for supporting and maneuvering a motorcycle heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,901,647; U.S. Pat. No. 4,681,299; U.S. Pat. No. 5,609,461; U.S. Pat. No. 1,532,728; U.S. Pat. No. Des. 378,155; and U.S. Pat. No. 5,335,923.

While these devices fulfill their respective, particular objectives and requirements, the aforementioned patents do not disclose a new motorcycle maneuvering apparatus. The inventive device includes a front dolly member having wheels, a pair of frame sections mounted thereupon, a pair of cross members secured to the frame sections, and a pair of tire support member threaded upon the cross members, and further includes a middle dolly member having wheels, a platform mounted thereupon, and a pair of adjustable kickstand retaining members, and also includes a rear dolly member having wheels, a pair of frame sections mounted thereupon, a pair of cross members secured to the frame sections, and a pair of tire support member threaded upon the cross members, and in addition includes a ramp member having a pair of arm members for removably mounting to the front and rear dolly members to load the tires thereupon.

In these respects, the motorcycle maneuvering apparatus according to the present invention substantially departs from the conventional concepts and designs of the prior art, and in so doing provides an apparatus primarily developed for the purpose of moving a motorcycle about in a cramped location.

SUMMARY OF THE INVENTION

In view of the foregoing disadvantages inherent in the known types of a dolly means for supporting and maneuvering a motorcycle now present in the prior art, the present invention provides a new motorcycle maneuvering apparatus construction wherein the same can be utilized for moving a motorcycle about in a cramped location.

The general purpose of the present invention, which will be described subsequently in greater detail, is to provide a new motorcycle maneuvering apparatus which has many of the advantages of the a dolly means for supporting and maneuvering a motorcycle mentioned heretofore and many novel features that result in a new motorcycle maneuvering apparatus which is not anticipated, rendered obvious, suggested, or even implied by any of the prior art a dolly means for supporting and maneuvering a motorcycle, either alone or in any combination thereof.

To attain this, the present invention generally comprises a front dolly member having wheels, a pair of frame sections mounted thereupon, a pair of cross members secured to the frame sections, and a pair of tire support member threaded upon the cross members, and further includes a middle dolly member having wheels, a platform mounted thereupon, and a pair of adjustable kickstand retaining members, and also includes a rear dolly member having wheels, a pair of frame sections mounted thereupon, a pair of cross members secured to the frame sections, and a pair of tire support member threaded upon the cross members, and in addition includes a ramp member having a pair of arm members for removably mounting to the front and rear dolly members to load the tires thereupon.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new motorcycle maneuvering apparatus which has many of the advantages of the a dolly means for supporting and maneuvering a motorcycle mentioned heretofore and many novel features that result in a new motorcycle maneuvering apparatus which is not anticipated, rendered obvious, suggested, or even implied by any of the prior art a dolly means for supporting and maneuvering a motorcycle, either alone or in any combination thereof.

It is another object of the present invention to provide a new motorcycle maneuvering apparatus which may be easily and efficiently manufactured and marketed.

It is a further object of the present invention to provide a new motorcycle maneuvering apparatus which is of a durable and reliable construction.

An even further object of the present invention is to provide a new motorcycle maneuvering apparatus which is susceptible of a low cost of manufacture with regard to both materials and labor, and which accordingly is then susceptible of low prices of sale to the consuming public, thereby making such motorcycle maneuvering apparatus economically available to the buying public.

Still yet another object of the present invention is to provide a new motorcycle maneuvering apparatus which provides in the apparatuses and methods of the prior art some of the advantages thereof, while simultaneously overcoming some of the disadvantages normally associated therewith.

Still another object of the present invention is to provide a new motorcycle maneuvering apparatus for moving a motorcycle about in a cramped location.

Yet another object of the present invention is to provide a new motorcycle maneuvering apparatus which includes a front dolly member having wheels, a pair of frame sections mounted thereupon, a pair of cross members secured to the frame sections, and a pair of tire support member threaded upon the cross members, and further includes a middle dolly member having wheels, a platform mounted thereupon, and a pair of adjustable kickstand retaining members, and also includes a rear dolly member having wheels, a pair of frame sections mounted thereupon, a pair of cross members secured to the frame sections, and a pair of tire support member threaded upon the cross members, and in addition includes a ramp member having a pair of arm members for removably mounting to the front and rear dolly members to load the tires thereupon.

Still yet another object of the present invention is to provide a new motorcycle maneuvering apparatus that is simple to use and very adaptable to any motorcycle.

Even still another object of the present invention is to provide a new motorcycle maneuvering apparatus that allows the user to move the motorcycle about in a garage.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

With reference now to the drawings, and in particular to FIGS. 1 through 10 thereof, a new motorcycle maneuvering apparatus embodying the principles and concepts of the present invention and generally designated by the reference numeral 10 will be described.

As best illustrated in FIGS. 1 through 10, the motorcycle maneuvering apparatus 10 generally comprises a front dolly member 11 having a plurality of wheels 12, a pair of elongate frame sections 13,14 conventionally supported upon the wheels 12, a pair of cross members 15,16 spaced apart and interconnecting the frame sections 13,14, and a pair of elongate adjustable tire support members 17,19 threaded upon the cross members 15,16 and each including an upright support member 18,20 fixedly and conventionally attached to near a front thereof and extending upwardly therefrom for supporting a tire 61. The cross members 15,16 of the front dolly member 11 have ends respectively and fastenably threaded with fasteners through the elongate frame sections 13,14. One of the cross members 16 of the front dolly member 11 is disposed near a front of the front dolly member 11 and the other of the cross member 15 of the front dolly member 11 is disposed near a rear of the front dolly member 11. The front dolly member 11 includes an axle support attachment comprising a pair of mounting brackets 50,51 each of which is securely mounted with fasteners to a respective one of the frame sections 13,14 of the front dolly member 11, and further includes a pair of telescopic members each of which has a base member 52,53 securely and conventionally attached to a respective one of the mounting brackets 50,51 and each of which has an upright extendable member 54,55 vertically movably mounted to a respective one of the base members 52,53; and an axle support cross member 59 having ends securely supported by and extending into the upright extendable members 54,55. Each of the telescopic members includes a plurality of holes 58 spaced along and extending in each the upright extendable member 54,55, and further includes a pair of adjustment members 56,57 each being threaded through a wall of a respective one of the base members 52,53 and being extendable in a selected one of the holes 58 for adjusting the height of each the upright extendable member 54,55.

Figures 3, 4:
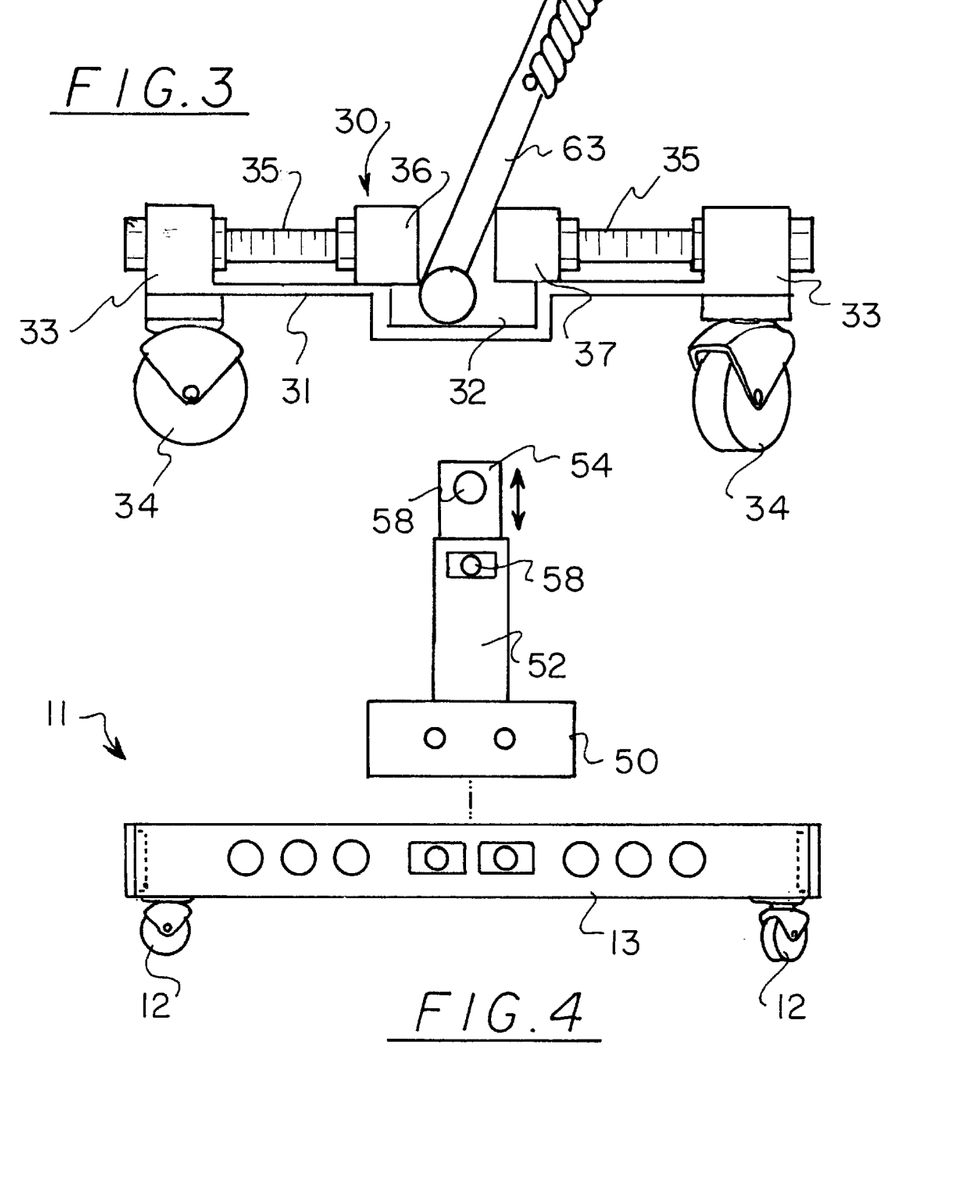
FIG. 3 is an end elevational view of the middle dolly member of the present invention.
FIG. 4 is a side elevational view of the middle dolly attachment of the present invention.
Figure 5:
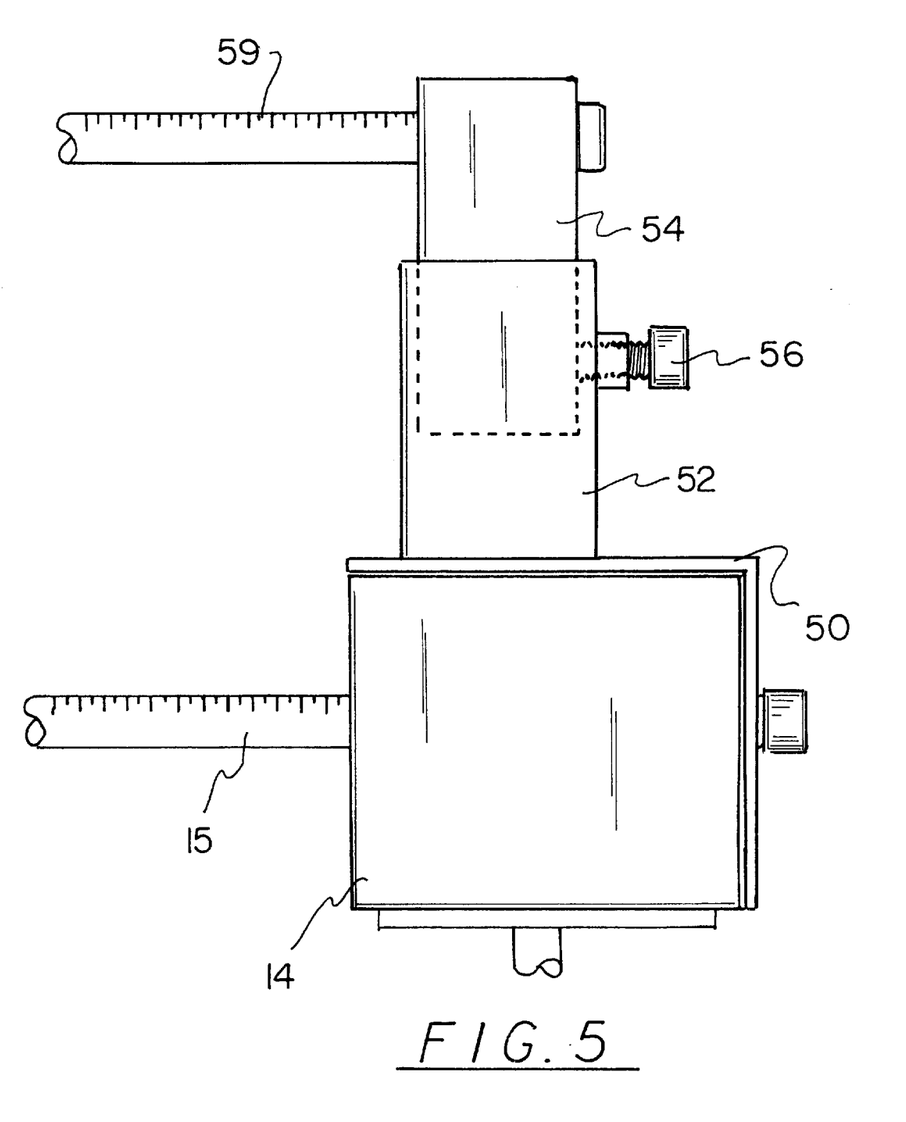
FIG. 5 is a detailed view of the axle support attachment of the present invention.

The motorcycle maneuvering apparatus 10 also includes a middle dolly member 30 having a plurality of wheels 34; a platform 31 conventionally mounted upon the wheels 34 and having a floor and side walls 33; a plurality of threaded support members 35 having ends fastenably threaded to the side walls 33; and a pair of elongate adjustable kickstand retaining members 36,37 fastenably threaded to ends of the threaded support members 35. The platform 31 includes a recessed portion 32 centrally disposed therein and extending the length thereof. The recessed portion 32 is adapted to receive and support a bottom of a kickstand 63 of a motorcycle 60.

Figure 6:
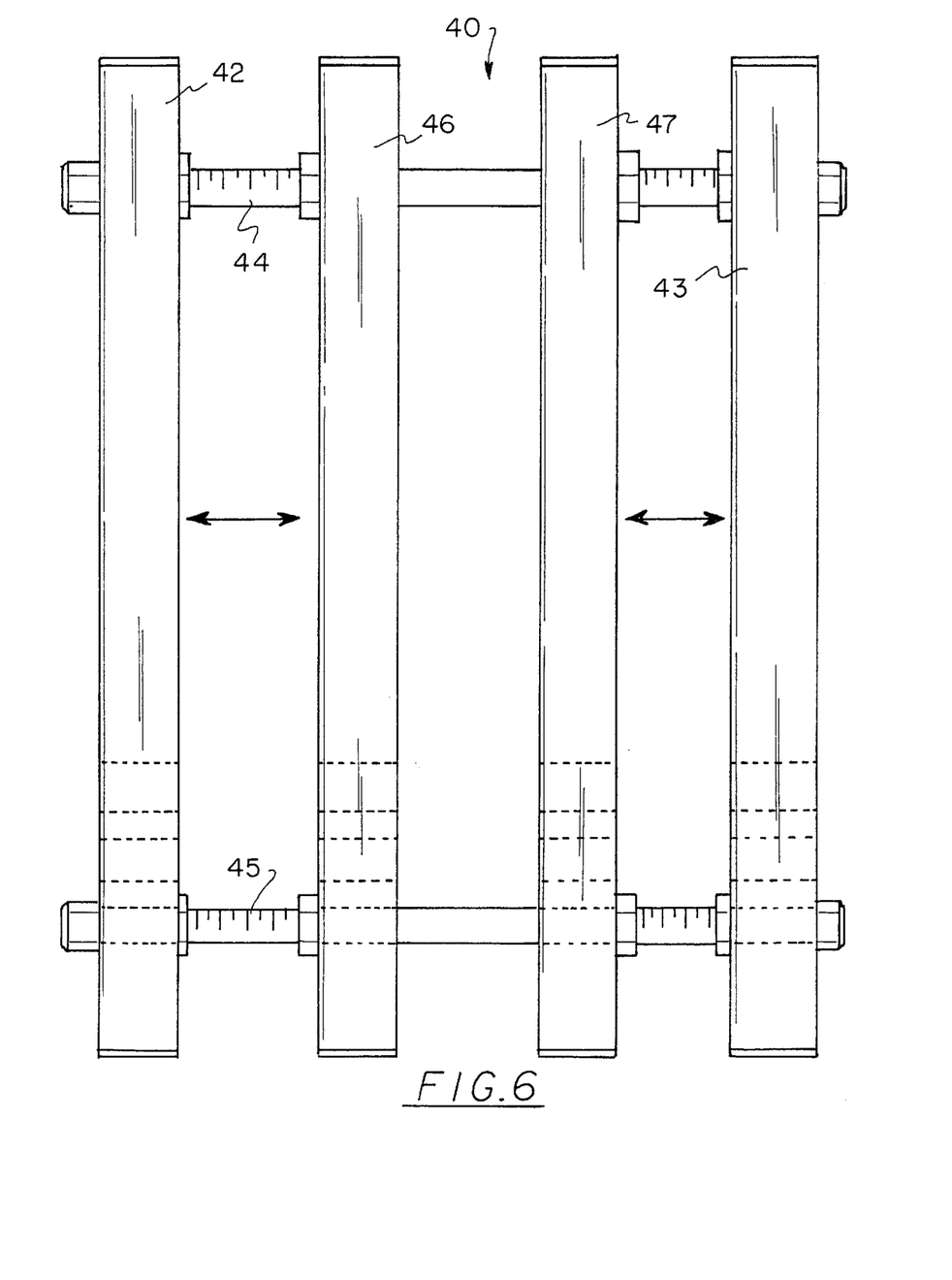
FIG. 6 is a top plan view of the rear dolly member of the present invention.
Figures 7, 8:
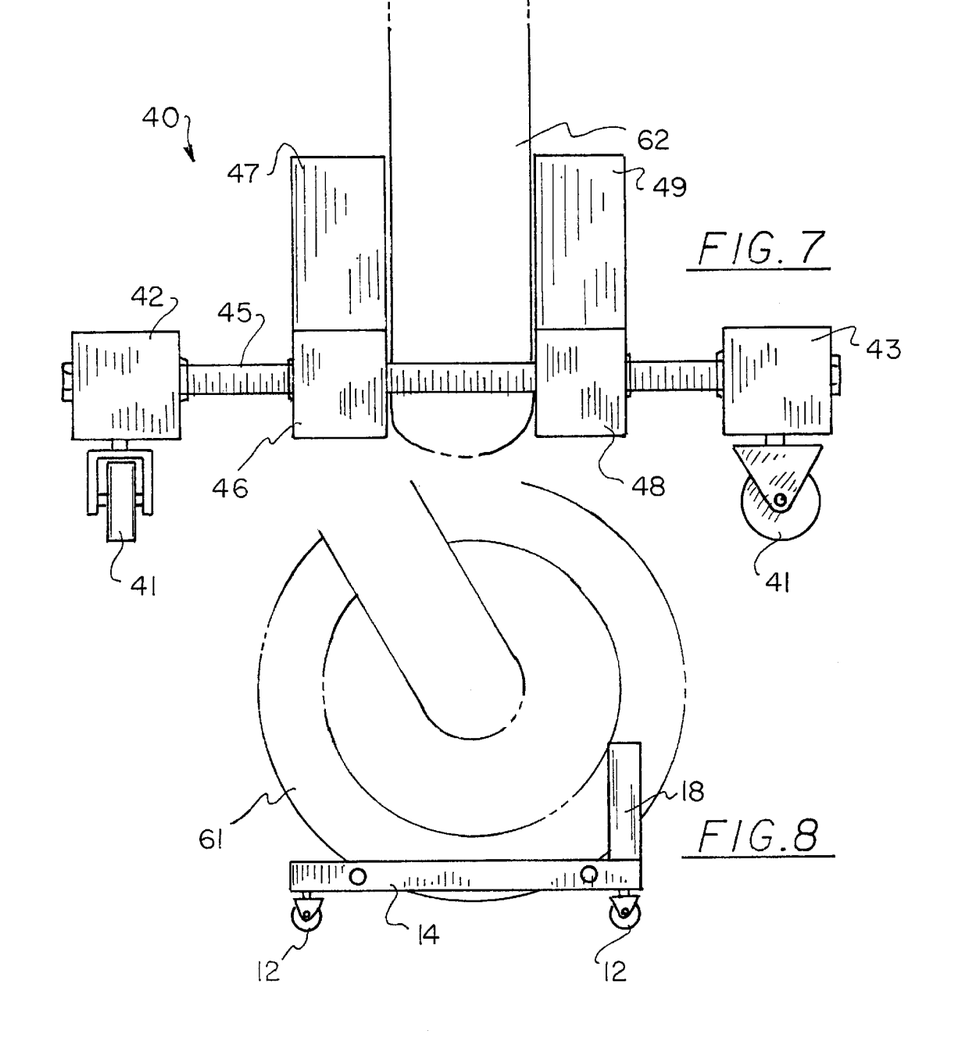
FIG. 7 is a front end elevational view of the front dolly member of the present invention.
FIG. 8 is a side elevational view of the front dolly attachment of the present invention.

In addition, the motorcycle maneuvering apparatus 10 includes a rear dolly member 40 having a plurality of wheels 41, a pair of frame sections 42,43 conventionally supported upon the wheels 41, a pair of cross members 44,45 spaced apart and interconnecting the frame sections 42,43, and a pair of elongate adjustable support members 46,48 threaded upon the cross members 44,45 each including an upright support member 47,49 fixedly and conventionally attached to near a front thereof and extending upwardly therefrom for supporting a tire 62. The cross members 44,45 of the rear dolly member 40 have ends respectively and fastenably threaded with fasteners through the elongate frame sections 42,43. One of the cross members 44 of the rear dolly member 40 is disposed near a front of the rear dolly member 40 and the other of the cross member 45 of the rear dolly member 40 is disposed near a rear of the rear dolly member 40.

Figures 9, 10:
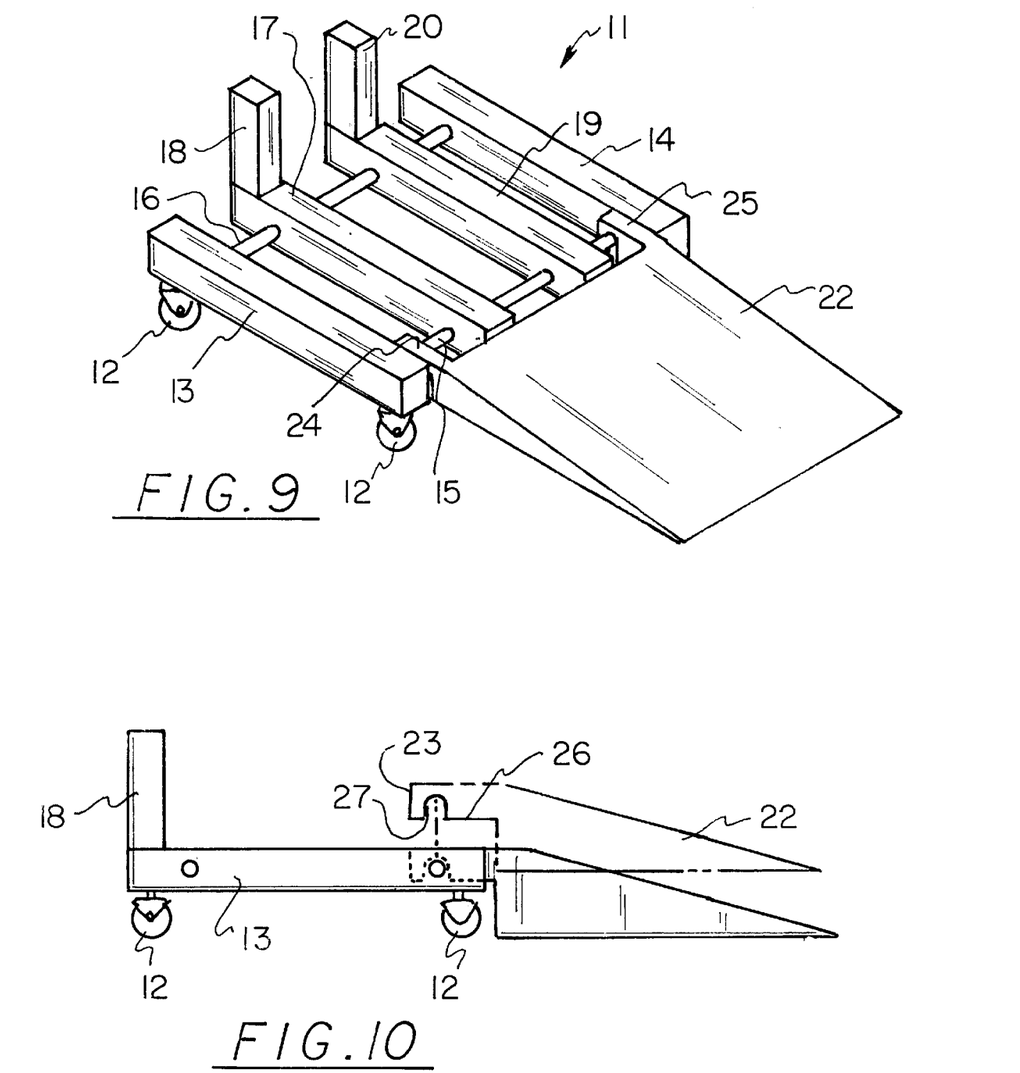
FIG. 9 is a perspective view of the front dolly member and ramp member of the present invention.
FIG. 10 is a side elevational view of the front dolly member and the ramp member of the present invention.

Further, the motorcycle maneuvering apparatus 10 includes a removable ramp member 22 having a front end 23, a pair of arm members 24,25 spaced apart and extending outwardly from the front end 23 and being removably supported upon one of the cross members 15 of the front dolly member 11 and the rear dolly member 40. Each of the arm members 24,25 includes a bottom side 26, and a slot 27 extending in the bottom side 26. The bottom side 26 is adapted to receive one of the cross members 15 disposed near the rear of the front dolly member 11 and the rear dolly member 40. The ramp member 22 is tapered downwardly from the front end 23 to a back end of the ramp member 22.

Figure 1:
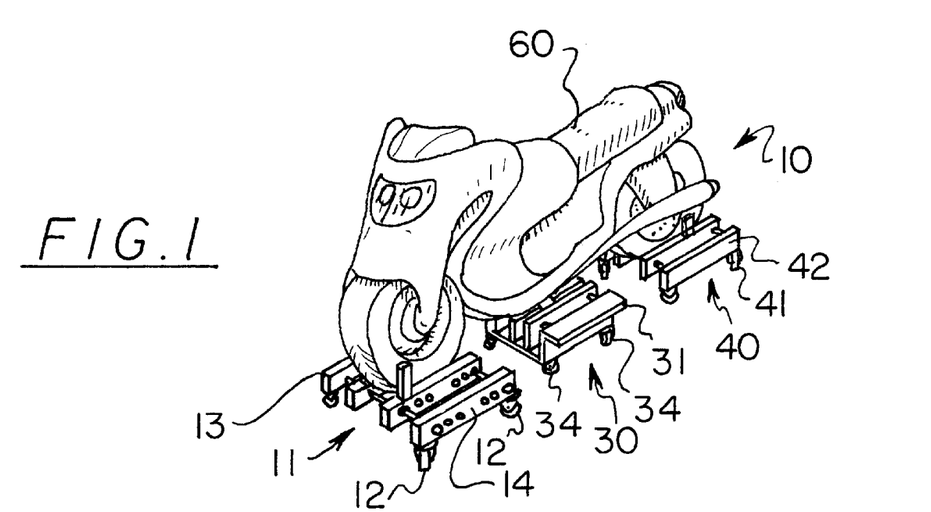
FIG. 1 is a perspective view of a new motorcycle maneuvering apparatus according to the present invention with a motorcycle mounted thereupon.
Figure 2:
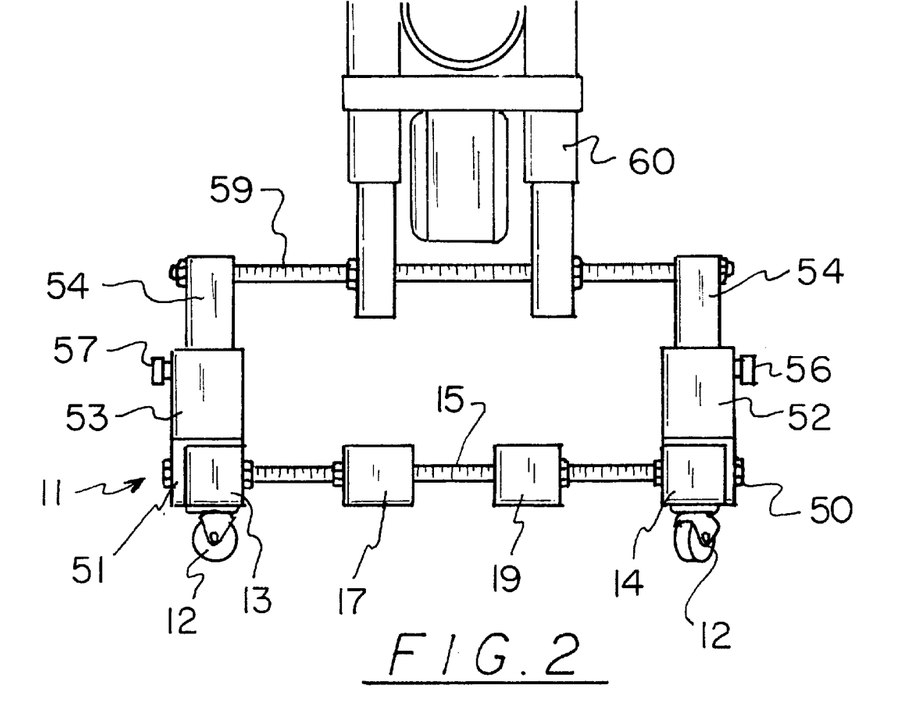
FIG. 2 is an end elevational view of the axle support attachment of the present invention.

In use, the user adjusts the elongate support members of both the front and rear dolly members and mounts the ramp member 22 on the front dolly member 11 to load the front tire 61 of the motorcycle 60 onto the front dolly member 11 and then mounts the ramp member 22 on the rear dolly member 40 to load the back tire 62 of the motorcycle 60 onto the rear dolly member 40, and then places the bottom of the kickstand 63 in the recessed portion 32 of the platform 31 and engages the kickstand retaining members 36,37 to the kickstand 63. The user can move the motorcycle 60 about as desired.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A motorcycle maneuvering apparatus comprising:
    a front dolly member having a plurality of wheels, a pair of elongate frame sections supported upon said wheels, a pair of cross members spaced apart and interconnecting said frame sections, and a pair of elongate adjustable tire support members threaded upon said cross members each said tire support member including an upright support member fixedly and conventionally attached to near a front thereof and extending upwardly therefrom for supporting a tire;
    a middle dolly member having a plurality of wheels; a platform mounted upon said wheels and having a floor and side walls; a plurality of threaded support members having ends fastenably threaded to said side walls; and a pair of elongate adjustable kickstand retaining members fastenably threaded to ends of said threaded support members;
    a rear dolly member having a plurality of wheels, a pair of frame sections supported upon said wheels, a pair of cross members spaced apart and interconnecting said frame sections, and a pair of elongate adjustable support members threaded upon said cross members each said tire support member including an upright support member fixedly and conventionally attached to near a front thereof and extending upwardly therefrom for supporting a tire; and
    at least one removable ramp member having a front end, a pair of arm members spaced apart and extending outwardly from said front end and being removably supported upon one of said cross members of said front dolly member and said rear dolly member.

2. A motorcycle maneuvering apparatus as described in claim 1, wherein said cross members of said front dolly member have ends respectively and fastenably threaded with fasteners through said elongate frame sections.

3. A motorcycle maneuvering apparatus as described in claim 2, wherein one of said cross members of said front dolly member is disposed near a front of said front dolly member and the other of said cross member of said front dolly member is disposed near a rear of said front dolly member.

4. A motorcycle maneuvering apparatus as described in claim 3, wherein said front dolly member includes an axle support attachment comprising a pair of mounting brackets each of which is securely mounted with fasteners to a respective one of said frame sections of said front dolly member; a pair of telescopic members each of which has a base member securely attached to a respective one of said mounting brackets and each of which has an upright extendable member vertically movably mounted to a respective one of said base members; and an axle support cross member having ends securely supported by and extending into said upright extendable members.

5. A motorcycle maneuvering apparatus as described in claim 4, wherein each of said telescopic members includes a plurality of holes spaced along and extending in each said upright extendable member, and further includes a pair of adjustment members each being threaded through a wall of a respective one of said base members and being extendable in a selected one of said holes for adjusting the height each said upright extendable member.

6. A motorcycle maneuvering apparatus as described in claim 3, wherein said cross members of said front dolly member have ends respectively and fastenably threaded with fasteners through said elongate frame sections.

7. A motorcycle maneuvering apparatus as described in claim 6, wherein one of said cross members of said rear dolly member is disposed near a front of said rear dolly member and the other of said cross member of said rear dolly member is disposed near a rear of said rear dolly member.

8. A motorcycle maneuvering apparatus as described in claim 7, wherein each of said arm members includes a bottom side, and a slot extending in said bottom side, said bottom side being adapted to receive one of said cross members disposed near said rear of said rear dolly member and said rear dolly member.

9. A motorcycle maneuvering apparatus as described in claim 8, wherein said ramp member is tapered downwardly from said front end to a back end of said ramp member.

10. A motorcycle maneuvering apparatus as described in claim 1, wherein said platform includes a recessed portion centrally disposed therein and extending the length thereof, said recessed portion being adapted to receive and support a bottom of a kickstand of a motorcycle.

11. A motorcycle maneuvering apparatus comprising:

a front dolly member having a plurality of wheels, a pair of elongate frame sections supported upon said wheels, a pair of cross members spaced apart and interconnecting said frame sections, and a pair of elongate adjustable tire support members threaded upon said cross members each said tire support member including an upright support member fixedly and conventionally attached to near a front thereof and extending upwardly therefrom for supporting a tire, said cross members of said front dolly member having ends respectively and fastenably threaded with fasteners through said elongate frame sections, one of said cross members of said front dolly member being disposed near a front of said front dolly member and the other of said cross member of said front dolly member being disposed near a rear of said front dolly member, said front dolly member including an axle support attachment comprising a pair of mounting brackets each of which is securely mounted with fasteners to a respective one of said frame sections of said front dolly member; a pair of telescopic members each of which has a base member securely attached to a respective one of said mounting brackets and each of which has an upright extendable member vertically movably mounted to a respective one of said base members; and an axle support cross member having ends securely supported by and extending into said upright extendable members, each of said telescopic members including a plurality of holes spaced along and extending in each said upright extendable member, and further including a pair of adjustment members each being threaded through a wall of a respective one of said base members and being extendable in a selected one of said holes for adjusting the height each said upright extendable member;

a middle dolly member having a plurality of wheels; a platform mounted upon said wheels and having a floor and side walls; a plurality of threaded support members having ends fastenably threaded to said side walls; and a pair of elongate adjustable kickstand retaining members fastenably threaded to ends of said threaded support members, said platform including a recessed portion centrally disposed therein and extending the length thereof, said recessed portion being adapted to receive and support a bottom of a kickstand of a motorcycle;

a rear dolly member having a plurality of wheels, a pair of frame sections supported upon said wheels, a pair of cross members spaced apart and interconnecting said frame sections, and a pair of elongate adjustable support members threaded upon said cross members each said tire support member including an upright support member fixedly and conventionally attached to near a front thereof and extending upwardly therefrom for supporting a tire, said cross members of said rear dolly member having ends respectively and fastenably threaded with fasteners through said elongate frame sections, one of said cross members of said rear dolly member being disposed near a front of said rear dolly member and the other of said cross member of said rear dolly member being disposed near a rear of said rear dolly member; and at least one removable ramp member having a front end, a pair of arm members spaced apart and extending outwardly from said front end and being removably supported upon one of said cross members of said front dolly member and said rear dolly member, wherein each of said arm members including a bottom side, and a slot extending in said bottom side, said bottom side being adapted to receive one of said cross members disposed near said rear of said front dolly member and said rear dolly member, said ramp member being tapered downwardly from said front end to a back end of said ramp member.

* * * * *